(12) United States Patent
Barksby et al.

(10) Patent No.: US 10,766,998 B2
(45) Date of Patent: Sep. 8, 2020

(54) FLEXIBLE POLYURETHANE FOAMS

(71) Applicant: Covestro LLC, Pittsburgh, PA (US)

(72) Inventors: Nigel Barksby, Moon Township, PA (US); Brian L. Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 64 days.

(21) Appl. No.: 15/819,261

(22) Filed: Nov. 21, 2017

(65) Prior Publication Data

US 2019/0153148 A1 May 23, 2019

(51) Int. Cl.
| | |
|---|---|
| C08G 18/62 | (2006.01) |
| C08G 18/76 | (2006.01) |
| C08G 18/18 | (2006.01) |
| C08G 18/48 | (2006.01) |
| C08G 18/63 | (2006.01) |
| C08G 18/40 | (2006.01) |
| C08G 101/00 | (2006.01) |

(52) U.S. Cl.
CPC ......... C08G 18/6283 (2013.01); C08G 18/18 (2013.01); C08G 18/4072 (2013.01); C08G 18/4804 (2013.01); C08G 18/4812 (2013.01); C08G 18/4866 (2013.01); C08G 18/632 (2013.01); C08G 18/7621 (2013.01); *C08G 2101/0008* (2013.01); *C08G 2101/0083* (2013.01)

(58) Field of Classification Search
CPC ............... C08G 18/18; C08G 18/4072; C08G 18/4804; C08G 18/4812; C08G 18/4866; C08G 18/6283; C08G 18/632; C08G 18/7621; C08G 2101/0008; C08G 2101/0083
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,404,109 A | 10/1968 | Milgrom et al. |
| 3,405,077 A | 10/1968 | Pastor et al. |
| 3,427,334 A | 2/1969 | Belner |
| 3,433,752 A | 3/1969 | Zagoren et al. |
| 3,454,504 A | 7/1969 | Murai et al. |
| 3,523,093 A | 8/1970 | Stamberger |
| 3,538,043 A | 11/1970 | Herold |
| 3,652,639 A | 3/1972 | Pizzini et al. |
| 3,823,201 A | 7/1974 | Pizzini et al. |
| 3,875,086 A | 4/1975 | Ramey et al. |
| 3,900,518 A | 8/1975 | Milgrom |
| RE28,715 E | 2/1976 | Stamberger |
| 3,941,849 A | 3/1976 | Herold |
| RE29,118 E | 1/1977 | Stamberger |
| 4,089,835 A | 5/1978 | Konig et al. |
| 4,104,236 A | 8/1978 | Simroth |
| 4,111,865 A | 9/1978 | Seefried, Jr. et al. |
| 4,119,586 A | 10/1978 | Shah |
| 4,125,505 A | 11/1978 | Critchfield et al. |
| 4,148,840 A | 4/1979 | Shah |
| 4,172,825 A | 10/1979 | Shook et al. |
| 4,209,593 A | 6/1980 | Khanna |
| 4,260,530 A | 4/1981 | Reischl et al. |
| 4,324,715 A | 4/1982 | Emerick |
| 4,367,259 A | 1/1983 | Fulmer et al. |
| 4,374,209 A | 2/1983 | Rowlands |
| 4,438,001 A | 3/1984 | Suzuki et al. |
| 4,472,560 A | 9/1984 | Kuyper et al. |
| 4,477,589 A | 10/1984 | Van Der Hulst et al. |
| 4,524,157 A | 6/1985 | Stamberger |
| 4,656,196 A | 4/1987 | Kelly et al. |
| 4,670,477 A | 6/1987 | Kelly et al. |
| 4,690,956 A | 9/1987 | Ramlow et al. |
| 4,722,946 A | 2/1988 | Hostettler |
| 4,839,397 A | 6/1989 | Lohmar et al. |
| 4,950,694 A | 8/1990 | Hager |
| 4,950,695 A | 8/1990 | Stone |
| 4,950,965 A | 8/1990 | Kenny et al. |
| 4,980,386 A | 12/1990 | Tiao et al. |
| 4,981,880 A | 1/1991 | Lehmann et al. |
| 4,987,156 A | 1/1991 | Tozune et al. |
| 5,011,908 A | 4/1991 | Hager |
| 5,114,619 A | 5/1992 | Heuvelsland |
| 5,145,883 A | 9/1992 | Saito et al. |
| 5,152,922 A | 10/1992 | Meyer et al. |
| 5,158,922 A | 10/1992 | Hinney et al. |
| 5,292,778 A | 3/1994 | Van Veen et al. |
| 5,321,077 A | 6/1994 | Hayes et al. |
| 5,324,774 A | 6/1994 | Nishikawa et al. |
| 5,358,984 A | 10/1994 | Hayes et al. |
| 5,364,906 A | 11/1994 | Critchfield et al. |
| 5,420,170 A | 5/1995 | Lutter et al. |
| 5,453,469 A | 9/1995 | Yezrielev et al. |
| 5,470,813 A | 11/1995 | Le Khac |
| 5,482,908 A | 1/1996 | Le Khac |
| 5,488,085 A | 1/1996 | Hayes et al. |
| 5,496,894 A | 3/1996 | Critchfield et al. |
| 5,539,011 A | 7/1996 | Hilker et al. |
| 5,554,662 A | 9/1996 | Sanders et al. |
| 5,594,066 A | 1/1997 | Heinemann et al. |
| 5,605,939 A * | 2/1997 | Hager ............... C08G 18/4072 521/137 |

(Continued)

FOREIGN PATENT DOCUMENTS

JP    2000290344 A    10/2000

*Primary Examiner* — John M Cooney

(74) *Attorney, Agent, or Firm* — N. Denise Brown

(57) ABSTRACT

This invention relates to a process for preparing a flexible polyurethane foam in which the isocyanate-reactive component comprises a specific isocyanate-reactive component. The invention also relates to flexible polyurethane foam wherein the isocyanate-reactive comprises the specific isocyanate-reactive component.

10 Claims, 1 Drawing Sheet

(56) References Cited

U.S. PATENT DOCUMENTS

| | | | |
|---|---|---|---|
| 5,631,319 A | 5/1997 | Reese et al. |
| 5,670,601 A | 9/1997 | Allen et al. |
| 5,689,012 A | 11/1997 | Pazos et al. |
| 5,777,177 A | 7/1998 | Pazos |
| 5,814,699 A | 9/1998 | Kratz et al. |
| 5,824,712 A | 10/1998 | Willkomm et al. |
| 5,916,994 A | 6/1999 | Izukawa et al. |
| 5,919,395 A | 7/1999 | Bastin et al. |
| 5,919,988 A | 7/1999 | Pazos et al. |
| 5,990,185 A | 11/1999 | Fogg |
| 5,995,534 A | 11/1999 | Fullerton et al. |
| 6,034,145 A | 3/2000 | Cornet et al. |
| 6,034,197 A | 3/2000 | Mahon et al. |
| 6,063,309 A | 5/2000 | Hager et al. |
| 6,066,683 A | 5/2000 | Beisner et al. |
| 6,117,937 A | 9/2000 | Matsumoto et al. |
| 6,136,879 A | 10/2000 | Nishida et al. |
| 6,218,444 B1 | 4/2001 | Hager et al. |
| 6,391,395 B1 | 5/2002 | Tseng et al. |
| 6,391,820 B1 | 5/2002 | Ooms et al. |
| 6,391,933 B1 | 5/2002 | Mattesky |
| 6,391,935 B1 | 5/2002 | Hager et al. |
| 6,455,603 B1 | 9/2002 | Fogg |
| 6,472,447 B1 | 10/2002 | Lorenz et al. |
| 6,491,846 B1 | 12/2002 | Reese, II et al. |
| 6,521,674 B1 | 2/2003 | Haley et al. |
| 6,624,209 B2 | 9/2003 | Kawamoto et al. |
| 6,638,986 B2 | 10/2003 | Falke et al. |
| 6,713,599 B1 | 3/2004 | Hinz et al. |
| 6,756,414 B2 | 6/2004 | Kawamoto et al. |
| 6,762,214 B1 | 7/2004 | Tracy et al. |
| 6,838,516 B2 | 1/2005 | Dai et al. |
| 7,051,389 B2 | 5/2006 | Wassilefky |
| 7,078,443 B2 | 7/2006 | Milliren |
| 7,179,882 B2 | 2/2007 | Adkins et al. |
| 7,415,742 B2 | 8/2008 | Wassilefsky |
| 7,469,437 B2 | 12/2008 | Mikkelsen et al. |
| 7,530,127 B2 | 5/2009 | Leifermann et al. |
| 7,735,169 B2 | 6/2010 | Wassilefsky |
| 7,754,809 B2 | 7/2010 | Stollmaier et al. |
| 7,759,423 B2 | 7/2010 | Chauk |
| 7,968,754 B2 | 6/2011 | Ostrowski et al. |
| 8,242,184 B2 | 8/2012 | Sasaki et al. |
| 8,268,906 B2 | 9/2012 | Sasaki et al. |
| 8,418,297 B2 | 4/2013 | Mikkelsen et al. |
| 8,487,015 B2 | 7/2013 | Sasaki et al. |
| 8,541,479 B2 | 9/2013 | Sasaki et al. |
| 8,656,537 B2 | 2/2014 | Leifermann et al. |
| 8,975,306 B2 | 3/2015 | Milliren |
| 8,975,335 B2 | 3/2015 | Hager et al. |
| 9,029,432 B2 | 5/2015 | Aou et al. |
| 9,133,298 B2 | 9/2015 | Hager et al. |
| 9,255,174 B2 | 2/2016 | Aou et al. |
| 9,266,996 B2 | 2/2016 | Obi et al. |
| 9,376,526 B2 | 6/2016 | Hager et al. |
| 2004/0019160 A1 | 1/2004 | Dai et al. |
| 2007/0299153 A1 | 12/2007 | Hager et al. |
| 2008/0139685 A1 | 6/2008 | Reese et al. |
| 2009/0062416 A1 | 3/2009 | Sasaki et al. |
| 2009/0069457 A1* | 3/2009 | Brown .............. C08G 18/4804 521/137 |
| 2009/0215918 A1 | 8/2009 | Sasaki et al. |
| 2010/0168262 A1 | 7/2010 | Sasaki et al. |
| 2011/0275732 A1* | 11/2011 | Bruchmann ....... C08G 18/4072 521/156 |
| 2012/0202908 A1 | 8/2012 | Sasaki et al. |
| 2013/0289150 A1 | 10/2013 | Hager et al. |
| 2015/0077640 A1 | 3/2015 | Kanda |
| 2016/0340464 A1 | 11/2016 | Mcvey et al. |
| 2017/0210847 A1* | 7/2017 | Okiyama ............... C08G 18/76 |
| 2017/0306076 A1 | 10/2017 | Adkins et al. |

* cited by examiner

FLEXIBLE POLYURETHANE FOAMS

BACKGROUND OF THE INVENTION

The invention relates to novel flexible polyurethane foams wherein the isocyanate-reactive component comprises (a) an in-situ formed polyol blend which comprises (i) one or more polyether monols and (ii) one or more polyether polyols; and (b) one or more polymer polyols. This invention also relates to a process of preparing these novel flexible polyurethane foams, wherein the isocyanate-reactive component comprises (a) an in-situ formed polyol blend which comprises (i) one or more polyether monols and (ii) one or more polyether polyols; and (b) one or more polymer polyols.

SUMMARY OF THE INVENTION

The novel flexible polyurethane foams comprise the reaction product of:
(1) toluene diisocyanate,
with
(2) an isocyanate-reactive component comprising:
  (a) from 70 to 95% by weight, based on 100% by weight of components (a) and (b), of an in-situ formed polyol blend having a hydroxyl number of from about 56 to about 250, an average functionality of greater than about 2, and which comprises:
    (i) from 25 to 75% by weight, based on 100% by weight of (i) and (ii), of a polyether monol having a hydroxyl number of less than 56, and containing less than 20% by weight of copolymerized oxyethylene, based on 100% by weight of (a)(i),
    and
    (ii) from 25 to 75% by weight, based on 100% by weight of (i) and (ii), of a polyether polyol having a hydroxyl number of about 47 to about 300, an average functionality of greater than 2 to about 6, and containing from about 5 to about 45% by weight of copolymerized oxyethylene, based on 100% by weight of (a)(ii);
  and
  (b) from 5 to 30% by weight, based on 100% by weight of components (a) and (b), of a filled polyol; in the presence of
(3) a blowing agent;
(4) a catalyst;
and
(5) a surfactant;
wherein the resultant foam has a 90% compression set of less than or equal to 10% (or less than or equal to 5%) as measured by ASTM D3574-11 at an isocyanate index of at least 100 (or at least 102, or at least 105).

The invention also relates to a process for the preparation of these novel flexible polyurethane foams. This process comprises:
(A) reacting
  (1) toluene diisocyanate;
  with
  (2) an isocyanate-reactive component comprising:
    (a) from 70 to 95% by weight, based on 100% by weight of components (a) and (b), of an in-situ formed polyol blend having a hydroxyl number of from about 56 to about 250, an average functionality of greater than about 2, and which comprises:
      (i) from 25 to 75% by weight, based on 100% by weight of (i) and (ii), of a polyether monol having a hydroxyl number of less than 56, and containing less than 20% by weight of copolymerized oxyethylene, based on 100% by weight of (a)(i), and
      (ii) from 25 to 75% by weight, based on 100% by weight of (i) and (ii), of a polyether polyol having a hydroxyl number of about 47 to about 300, an average functionality of greater than 2 to about 6, and containing from about 5 to about 45% by weight of copolymerized oxyethylene, based on 100% by weight of (a)(ii);
    and
    (b) from 5 to 30% by weight, based on 100% by weight of components (a) and (b), of a filled polyol;
  in the presence of
  (3) a blowing agent;
  (4) a catalyst;
  and
  (5) a surfactant;
wherein the resultant foam has a 90% compression set of less than or equal to 10% (or less than or equal to 5%) as measured by ASTM D3574-11 at an isocyanate index of at least 100 (or at least 102, or at least 105).

Another feature of the present invention involves the use of foam processing aids or foam modifiers that enhance foam properties and response characteristics.

DETAILED DESCRIPTION OF THE INVENTION

Figure 1A:
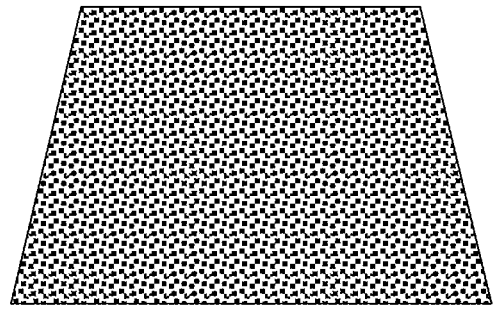
FIG. 1A is a cross-sectional view of a foam block which illustrates cold flow.

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise, and were determined by GPC as described herein.

All number average and weight average, $M_n$ and $M_w$, respectively, molecular weights herein were determined by gel-permeation chromatography (GPC) using a method based on DIN 55672-1 employing chloroform as the eluent with a mixed bed column (Agilent PL Gel; SDVB; 3 micron Pore diameter: 1Mixed-E+5 micron Pore diameter: 2×Mixed-D), refractive index (RI) detection and calibrated with polyethylene glycol.

All hydroxyl numbers (i.e. OH numbers) herein were determined according to ASTM D4274-11, and are reported in mg KOH/g polyol.

All viscosities herein were measured on an Anton-Paar SVM 3000 viscometer at 25° C. that has been demonstrated to give equivalent results as can be generated with ASTM-D4878-15. The instrument was calibrated using mineral oil reference standards of known viscosity. The viscosities are given in mPa·s at 25° C.

The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene:acrylonitrile in the total polymer. One skilled in the art will recognize that this is an analytical confirmation of the main mechanism for controlling the S/AN ratio, which is the wt % of monomers in the total reactor feed.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provide an isocyanate index of 100%.

As used herein, the definition of cold flow is the distortion, deformation or dimensional change which takes place in materials under continuous load at ambient temperature (source: CRC Press LLC, 1989). By "continuous load" it is meant the slabstock foam's own weight. A foam block which exhibits cold flow is shown in FIG. 1A. Such foams have a trapezoidal shape.

Figure 1B:
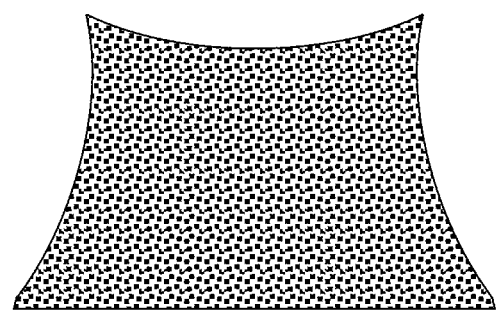
FIG. 1B is a cross-sectional view of a foam block which illustrates dishing.

As used herein, the term dishing is used to refer to the distortion, deformation or dimensional change which takes place in materials under continuous load at ambient temperature similarly to cold flow but dishing specifically refers to foams or materials in which the sides and top of the foam block pucker as shown in FIG. 1B.

As used herein, the term nominal equivalent weight refers to the expected molar weight per reactive hydroxyl group assuming the epoxide adds exclusively to the low equivalent weight polyol component, once the continuous polyol starter (Sc) feed is begun. The nominal molecular weight is the nominal number average equivalent weight multiplied by the starter functionality. The nominal hydroxyl number equals 56,100 divided by the nominal equivalent weight.

The flexible polyurethane foams of the invention comprise the reaction product of:

(1) toluene diisocyanate;
with
(2) an isocyanate-reactive component comprising:
  (a) from 70 to 95% by weight, based on 100% by weight of components (a) and (b), of an in-situ formed polyol blend having a hydroxyl number of from about 56 to about 250, an average functionality greater than about 2, and comprising:
    (i) from 25 to 75% by weight, based on 100% by weight of (i) and (ii), of a polyether monol having a hydroxyl number of less than 56, and containing less than 20% by weight of copolymerized oxyethylene, based on 100% by weight of (a)(i),
    and
    (ii) from 25 to 75% by weight, based on 100% by weight of (i) and (ii), of a polyether polyol having a hydroxyl number of about 47 to about 300, an average functionality of greater than 2 to about 6, and containing from about 5 to about 45% by weight of copolymerized oxyethylene, based on 100% by weight of (a)(ii);
  and
  (b) from 5 to 30% by weight, based on 100% by weight of components (a) and (b), of a filled polyol;
in the presence of
(3) a blowing agent;
(4) a catalyst;
and
(5) a surfactant;
wherein the resultant foam has a 90% compression set of less than or equal to 10% (or less than or equal to 5%) as measured by ASTM D3574-11 at an isocyanate index of at least 100 (or of at least 102, or of at least 105).

In accordance with the present invention, the isocyanate-reactive component comprises (a) from 70 to 95% by weight (or from 75 to 90% by weight) based on 100% by weight of components (a) and (b), of an in-situ formed polyol blend having a hydroxyl number of from about 56 to about 250 (or from about 75 to about 150), a functionality of greater than 2, and which comprises (i) from 25 to 75% by weight of a polyether monol having an average hydroxyl number of less than 56 (or of less than 28) and containing less than or equal to 20% by weight (or less than or equal to 15% by weight, or less than or equal to 10% by weight) of copolymerized oxyethylene, based on 100% by weight of (a)(i); and (ii) from 25 to 75% by weight of a polyether polyol having a hydroxyl number of about 47 to about 300 (or of about 70 to about 240) and containing from about 5% to about 45% by weight (or about 10 to about 40% by weight, or about 15% to about 35% by weight) of copolymerized oxyethylene, based on 100% by weight of (a)(ii); and (b) from about 5 to about 30% by weight (of from 10 to 25% by weight), based on 100% by weight of components (a) and (b), or a filled polyol.

Suitable polyether monols for component (a)(i) include those monols having a hydroxyl number of less than 56, or of less than 28.

Suitable starters for (a)(i) include polyoxyalkylene monols formed by addition of multiple equivalents of epoxide to low molecular weight monofunctional starters such as, for example, methanol, ethanol, phenols, allyl alcohol, longer chain alcohols, etc., and mixtures thereof. Examples of suitable longer chain alcohols include $C_{12}$, $C_{13}$, $C_{14}$ and/or $C_{15}$ monols, which may be used individually or as mixtures. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group. Suitable monofunctional starters include those monols described in, for example, U.S. Pat. Nos. 6,391,935 and 6,821,308, the disclosures of which are hereby incorporated by reference.

In one embodiment, the polyoxyalkylene monol starter comprises a polyoxypropylene monol having a hydroxyl number of less than 56. These compounds facilitate DMC catalyzed addition of epoxide and provide good build ratios for the production of the in-situ formed polyol blends (a).

The polyether monols may also be characterized in one embodiment as containing up to about 20% by weight of copolymerized oxyethylene, based on 100% by weight of the monofunctional polyether. This weight percentage includes the initiator or starter and all of the added epoxide(s). These polyether monols may contain less than or equal to about 20% by weight, or less than or equal to about 15% by weight, or less than or equal to about 10% by weight, based on 100% by weight of the polyether monol, of copolymerized oxyethylene. These polyether monols may also contain more than 0%, or at least about 2% or at least about 5%, based on 100% by weight of the monofunctional polyether, of copolymerized oxyethylene. The amount of copolymerized oxyethylene present in the polyether monols may vary between any combination of these upper and lower values, inclusive, such as, of more than 0% to less than or equal to about 20%, or at least about 2% to less than or equal to about 15%, or at least about 5% to less than or equal to about 10% by weight.

The polyether monols can have virtually any desired arrangement of oxyalkylene units with the proviso that these contain less than 20% of copolymerized oxyethylene, based on 100% by weight of the polyether monol. This weight percentage includes the initiator or starter and all of the added epoxide(s). In general, all of the oxyethylene units are not concentrated at the end of the polyoxyalkylene monols such that the primary hydroxyl group content of the monol is less than 23% by weight. Some examples of suitable polyether monols include block PO homopolymers, block EO-PO copolymers, random EO/PO copolymers, PO polymers that are "tipped" with EO or with a mixture of EO and PO are possible but not preferred. These "tipped" PO polymers should use a mixture of EO and PO to achieve a particular oxyethylene content and/or a desired primary hydroxyl content (less than 23%), or any other desired configuration. The so-called PO homopolymers are suitable with the proviso that they satisfy the above described amounts of copolymerized oxyethylene.

Suitable polyether polyols for component (a)(ii) typically have a hydroxyl number of from about 47 to about 300, an average functionality of greater than 2 to about 6. These polyether polyols may also have hydroxyl numbers of from at least about 47, or from at least about 70. The polyether polyols may also have hydroxyl numbers of less than or equal to 300, or of less than or equal to 240. Suitable polyether polyols may also have a hydroxyl number ranging between any combination of these upper and lower values, inclusive, of from at least about 47 to about 300, or from at least about 70 to about 240. The polyether polyols may also have an average functionality of greater than 2.0, or of at least about 2.5. The average functionality of the polyether polyols may also be less than or equal to about 6, or less than or equal to about 3.5. Suitable polyether polyols may have an average functionality ranging between any combination of these upper and lower values, inclusive, such as from greater than 2 to about 6, or from at least about 2.5 to about 3.5. These polyether polyols (ii) may be prepared from low molecular weight starters such as, for example, glycerin, propylene glycol, dipropylene glycol, ethylene glycol, trimethylolpropane, sucrose, sorbitol, tripropylene glycol, and the like, and mixtures thereof.

In one embodiment, component (a)(ii) comprises a combination of at least one polyether polyol having an average functionality of 2 and of at least one polyether polyol having an average functionality of about 3.

Suitable polyether polyols for component (a)(ii) contain from about 5 to about 45% by weight of copolymerized oxyethylene. These polyether polyols may contain at least about 5%, or at least about 10%, or at least about 15%, of copolymerized oxyethylene, based on 100% by weight of the polyether polyol (a)(ii). These polyether polyols may contain about 45% or less, or about 40% or less, or about 35% or less of copolymerized oxyethylene, based on 100% by weight of the polyether polyol (a)(ii). These weight percents include the starter or initiator, and all of the added epoxide(s). Suitable polyether polyols herein may contain any amount of copolymerized oxyethylene between the above disclosed upper and lower values, inclusive, unless otherwise stated, such as at least about 5% to about 45% or less, or at least about 10% to about 40% or less, or at least about 15% to about 35% by weight or less These polyether polyols (a)(ii) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration.

Suitable filled polyols for component (b) include filled polyols which are also known as polymer polyols. Examples of suitable filled polyols for the invention include, for example, (i) styrene/acrylonitrile polymer polyols, (ii) polyisocyanate polyaddition (PIPA) polyols which are dispersions of polyurethanes formed by the in-situ reaction of an isocyanate and an alkanolamine, (iii) polyhydrazodicarbonamide dispersion polyols (also known as PHD polyols), and (iv) mixtures thereof.

Suitable (i) SAN polymer polyols herein are prepared by free radical polymerization of monomers (i.e. styrene and acrylonitrile) in a polyol carrier (or base polyol) to produce a free radical polymer dispersed in the polyol carrier (or base polyol). Conventionally, the solids content of SAN polymer polyols is from about 5% up to about 60% by weight of solids, based on the total weight of the SAN polymer polyol composition. The solids content may be at least about 5%, or at least about 10% by weight of solids, based on the total weight of the SAN polymer polyol composition. The solids content may also be about 60% by weight or less, or about 50% by weight or less, based on the total weight of the SAN polymer polyol composition. The amount of solids content may range between any combination of these upper and lower ranges, inclusive, such as from about 5% to about 60%, or from about 10% to about 50% by weight of solids, based on the total weight of the SAN polymer polyol composition. Generally, these SAN polymer polyols have a viscosity in the range of from about 2,000 to about 8,000 centipoise.

Examples of suitable SAN polymer polyols to be used as component (b) herein include those SAN polymer polyols disclosed in, for example, but are not limited to, U.S. Pat. Nos. 5,321,077, 5,324,774, 5,364,906, 5,358,984, 5,453,469, 5,488,085, 5,496,894, 5,554,662, 5,594,066, 5,814,699, 5,824,712, 5,916,994, 5,995,534, 5,990,185, 6,117,937, 6,455,603, 6,472,447, 6,624,209, 6,713,599, 6,756,414, 7,179,882, 7,759,423, etc., the disclosures of which are hereby incorporated by reference.

The SAN polymer polyols suitable for the present invention are prepared by the in-situ polymerization of acrylonitrile and styrene, in a base polyol. Suitable base polyols may be conventional polyether polyols, polyester polyols, poly (oxyalkylene) polyols, etc. Methods for preparing SAN polymer polyols are known and described in, for example, U.S. Pat. Nos. 3,304,273; 3,383,351; 3,523,093; 3,652,639; 3,823,201; 4,104,236; 4,111,865; 4,119,586; 4,125,505; 4,148,840; 4,172,825; 4,524,157; 4,690,956; Re-28,715; and Re-29,118, the disclosures of which are hereby incorporated by reference.

One suitable SAN polymer polyol to be used as component (b) in the present invention comprises the free radical polymerization product of styrene and acrylonitrile in a base polyol, wherein the base polyol has a functionality of about 3, a molecular weight of about 4750, and an OH number of about 20. The solids content of this SAN polymer polyol is about 43% solids, in which the styrene to acrylonitrile content is about 64% to 36%.

Another suitable SAN polymer polyol for component (b) in the present invention comprises the free radical polymerization product of styrene and acrylonitrile in a base polyol, wherein the base polyol has a functionality of about 3, a molecular weight of about 3000, and an OH number of about 25. The solids content of this SAN polymer polyol is about 49% solids, in which the styrene to acrylonitrile content is about 67% to 33%.

Suitable polyisocyanate polyaddition (PIPA) polyols for component (b) contain polyurethane particles dispersed in a polyol carrier (i.e. base polyol). The polyurethane particles in PIPA polyols are formed in-situ by the reaction of an isocyanate with an alkanolamine (e.g., triethanolamine). The solids content of the PIPA polyols may typically range from 5% up to about 60% by weight, based on the total weight of the PIPA composition. The solids content may be at least about 5%, or at least about 10% by weight of solids, based on the total weight of the PIPA composition. The solids content may also be about 60% by weight of less, or about 50% by weight or less, based on the total weight of the PIPA composition. The amount of solids content may range between any combination of these upper and lower ranges, inclusive, such as from about 5% to about 60%, or from about 10% to about 50% by weight of solids, based on the total weight of the PIPA composition.

Generally, PIPA polyols have a viscosity in the range of from about 4,000 to about 50,000 centipoise. Examples of suitable PIPA polyols can be found in, for example, U.S. Pat. Nos. 4,374,209 and 5,292,778, the disclosures of which are herein incorporated by reference.

Suitable polyhydrazodicabonamide polyols (which are also commonly referred to as PHD polyols or PHD dispersion polyols) to be used as component (b) of the present invention include, for example, those compounds which are typically prepared by the in-situ polymerization of an isocyanate mixture with an amine group containing compound such as, a diamine and/or a hydrazine, in a base polyol. Suitable base polyols typically comprise polyether polyols and polyoxyalkylene polyols. Methods for preparing PHD polymer polyols are described in, for example, U.S. Pat. Nos. 4,089,835 and 4,260,530, the disclosures of which are hereby incorporated by reference.

PHD polyols typically have solids contents within the range of from about 3 to about 30 wt. %, based on the total weight of the PHD polyol. The solids content of the PHD polyols may be from at least about 3%, or from at least about 5% by weight, based on the total weight of the PHD polyol. The solids content of the PHD polyols may also be about 30% or less, or about 25% by weight or less, based on the total weight of the PHD polyol. The PHD polyols may have a solids content that ranges between any combination of these upper and lower values, inclusive, such as from about 3% to about 30% by weight, or from about 5 to about 25% by wt., based on the total weight of the PHD polyol.

As previously stated, PHD polyols are typically prepared by the in-situ polymerization of an isocyanate mixture in a polyol. More specifically, the isocyanate mixture typically comprises about 80 parts by weight, based on the total weight of the isocyanate mixture, of 2,4-toluene diisocyanate, and about 20 parts by weight, based on the total weight of the isocyanate mixture, of 2,6-toluene diisocyanate.

Suitable amine group containing compounds to be polymerized with the isocyanate compound include in preparing the PHD polyols, for example, compounds such as polyamines, hydrazines, hydrazides, ammonia or mixtures of ammonia and/or urea and formaldehyde.

Suitable polyamines include divalent and/or higher valent primary and/or secondary aliphatic, araliphatic, cycloaliphatic and aromatic amines, e.g. ethylene diamine; 1,2- and 1,3-propylene diamine; tetramethylene diamine; hexamethylene diamine; dodecamethylene diamine; trimethyl diaminohexane; N,N'-dimethyl-ethylenediamine; 2,2'-bisaminopropyl-methylamine; higher homologues of ethylene diamine, such as diethylene triamine, triethylene tetramine and tetraethylene pentamine; homologues of propylene diamine, such as dipropylene triamine, piperazine, N,N'-bis-aminoethyl-piperazine, triazine, 4-aminobenzylamine, 4-aminophenyl ethylamine, 1-amino-3,3,5-trimethyl-5-aminomethylcyclohexane, 4,4'-diaminodicyclohexyl-methane and -propane, 1,4-diaminocyclohexane, phenylenediamines, naphthylene diamines; condensates of aniline and formaldehyde; tolylene diamines; the bis-aminomethylbenzenes and derivatives of the above mentioned aromatic amines monoalkylated on one or both nitrogen atoms. The polyamines generally have a molecular weight of from 48 to 10,000. They may also have molecular weights of 60 to 1000, or of 62 to 200.

The hydrazines used may be hydrazine itself or mono-substituted or N,N'-disubstituted hydrazines. The substituents may be $C_1$ to $C_6$ alkyl groups, cyclohexyl groups or phenyl groups. The hydrazines generally have a molecular weight of from 32 to 200. Hydrazine itself is suitable for the invention herein.

Suitable hydrazides include the hydrazides of divalent or higher valent carboxylic acids such as carbonic acid, oxalic acid, malonic acid, succinic acid, adipic acid, sebacic acid, azelaic acid, maleic acid, fumaric acid, phthalic acid, isophthalic acid, and terephthalic acid; the esters of a hydrazine monocarboxylic acid with dihydric or higher hydric alcohols and phenols such as ethanediol, propane-1,2-diol, butane-1,2-diol, -1,3-diol and -1,4-diol, hexanediol, diethyleneglycol, triethyleneglycol, tetraethyleneglycol, dipropyleneglycol, tripropyleneglycol and hydroquinone; and the amides of hydrazinomonocarboxylic acid (semicarbazides), e.g. with the above mentioned diamines and polyamines. The hydrazides generally have a molecular weight of from 70 to 10,000, or from 75 to 1000, or from 90 to 500. Any combination of these upper and lower limits for molecular weights can be used for the hydrazides herein.

In special cases, a proportion of isocyanates or amines, hydrazines and hydrazides which have a functionality higher than 2 may also be used, especially in combination with the corresponding monofunctional compounds.

In accordance with the present invention, preferred base polyols for preparing the PHD polyols comprise polyether polyols and poly(oxyalkylene) polyols.

PHD polymer modified polyols are typically prepared by the in-situ polymerization of an isocyanate mixture with a diamine and/or hydrazine in a base polyol, preferably, a polyether polyol. Methods for preparing PHD polymer polyols are described in, for example, U.S. Pat. Nos. 4,089,835, 4,260,530 and 4,324,715, the disclosures of which are hereby incorporated by reference.

In an embodiment of the invention, the isocyanate-reactive component may additionally comprise component (c) a polyether polyol. Component (c) may be present in amounts of from 0 to about 50% by weight, or from about 1 to about 40% by weight, based on 100% by weight of components (a), (b) and (c).

In an embodiment of the invention, the isocyanate-reactive component may additionally comprise (c) a polyether polyol having an OH number of from about 10 to about 300, a functionality of from about 2 to about 8, and contain from 0 to 45% by weight of copolymerized oxyethylene, based on 100% by weight of component (c).

Suitable compounds to be used as polyether polyols (c) include those polyols which have a functionality of at least about 2 to about 8 or less, a hydroxyl number of at least about 10 to about 300 or less, and contain from 0% to about 45% by weight of copolymerized oxyethylene, based on 100% by weight of the polyether polyol (c). These polyether polyols are different than the polyether polyols (a)(ii).

These polyether polyols for component (c) may have hydroxyl numbers of from at least about 10 mg KOH/g polyol, or at least about 20 mg KOH/g polyol, or at least about 25 mg KOH/g polyol. In addition, the polyether polyols generally have hydroxyl numbers of about 300 mg KOH/g polyol or less, or about 150 mg KOH/g polyol or less, or about 75 mg KOH/g polyol or less. The suitable polyether polyols of the present invention may be characterized by a hydroxyl number between any of the above values, inclusive, unless otherwise stated, such as, from at least about 10 to about 300 mg KOH/g polyol or less, or at least about 20 to about 150 mg KOH/g polyol or less, or at least about 25 mg KOH/g polyol to about 75 mg KOH/g polyol or less.

The average functionality of these polyether polyols (c) ranges from at least about 2 to about 8 or less. These polyether polyols may also have an average functionality of at least about 2, or at least about 2.5, or at least about 3. These polyether polyols may have an average functionality of 8 or less, or of 6 or less, or of 4 or less. In addition, these polyether polyols may have functionalities between any of the above values, inclusive, such as from at least about 2 to about 8 or less, or from at least about 2.5 to about 6 or less, or from at least about 3 to about 4 or less.

Some examples of suitable polyether polyols for component (c) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (c) include low molecular weight starters such as, for example, glycerin, propylene glycol, dipropylene glycol, ethylene glycol, trimethylolpropane, sucrose, sorbitol, tripropylene glycol, and the like, and mixtures thereof.

Suitable epoxides for component (c) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

In an embodiment of the present invention, the isocyanate-reactive component is free of polyether polyols which have a functionality of at least about 2 to about 8 or less, a hydroxyl number of at least about 20 to about 240 or less, and contain at least 50% of copolymerized oxyethylene, based on 100% by weight of the polyether polyol. These polyether polyols are commonly referred to as cell opening polyols.

The process of the invention may be at an isocyanate index of at least 100.

In one embodiment according to the invention, a foam modifier or foam processing aid is added to the formulation to enhance processing and help stabilize the foam against cold flow and/or dishing by providing dimensional stability against deformation and reduced settling of the foam. These processing aids or modifiers are typically chain extenders and/or cross-linking agents. In general, chain extenders and/or cross-linking agents are relatively small molecules which contain from 2 to 8 active hydrogen groups. The chain extenders and/or cross-linking agents may contain at least 2 active hydrogen groups, or at least 3 active hydrogen groups. Chain extenders and/or cross-linking agents may also contain less than or equal to 8 active hydrogen groups, or less than or equal to 6 active hydrogen groups. Suitable chain extenders and/or cross-linking agents may contain any number of active hydrogen groups in any combination ranging between these upper and lower values, inclusive, such as at least 2 to less than or equal to 8 active hydrogen groups, or at least 3 to less than or equal to 6 active hydrogen groups. Suitable chain extenders and/or cross-linking agents are added in amounts of from 0 to 4 parts per hundred parts of polyol. Some examples of suitable chain extenders and/or cross-linking agents that may be included in the reaction mixture of the invention include diethanolamine (DEOA), ethylene glycol (EG), diethylene glycol (DEG), propylene glycol (PG), dipropylene glycol (DPG), 1,4-butanediol (BDO), Arcol DP1022, Ortegol 204, Geolite 206 and Geolite 210. Some of these aids are described in, for example, U.S. Pat. Nos. 4,950,694 and 5,539,011, the disclosures of which are hereby incorporated by reference. Processing additives are particularly useful in accordance with the invention when TDI is used as the isocyanate component. These chain extenders and/or cross-linking agents may be present in amount of 0 parts or higher, or of 0.3 parts or higher, per hundred parts of polyol. The chain extenders and/or crosslinking agents may also be present in amounts of 4 parts or less, or of 2 parts or less, per hundred parts of polyol. The amount of chain extenders and/or crosslinking agent present may range between any combination of these upper and lower values, inclusive, such as from 0 to 4 parts, or from 0.3 to 2 parts per hundred parts polyol. It may also be beneficial at times to use a combination of these different foam modifiers or processing aids.

In addition, the foam modifiers or processing aids may have an OH number of at least 300, or of at least 600.

One definition of cold flow is the distortion, deformation or dimensional change which takes place in materials under continuous load at ambient temperature (source: CRC Press LLC, 1989). By "continuous load" it is meant the slabstock foam's own weight. A deformed appearance on the part of the slabstock foam is linked to an inhomogeneous distribution of the density throughout the entire foam and hence also some variance in the impression resistance. An example of cold flow is shown in FIG. 1A. Dishing is similar to cold flow but the sides and top of the foam block can pucker in as shown in FIG. 1B. The use of these modifiers will help obtain foam with good cold-flow properties which for the purposes of the present invention refer to good dimensional stability against deformation and preferably also reduced settling on the part of the foam, preferably paired with a uniform density distribution for the same impression resistance.

Suitable blowing agents (3) for the present invention include, for example chemical blowing agents, i.e. isocyanate reactive agents that generate blowing gases, such as for example water and formic acid and physical blowing agents such as acetone, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, and are described in U.S. Pat. No. 4,972,002, the disclosure of which is herein incorporated by reference.

The amount of blowing agent or blowing agent mixture used may range from 0.5 to 20% by weight, based on 100% by weight of the isocyanate reactive component. In some instances, the amount of blowing agent present may be at least 0.5% or at least 0.75% by weight, based on 100% by weight of the isocyanate-reactive component. The amount of blowing agent present may also be about 20% or less, or about 10% by weight or less, based on 100% by weight of the isocyanate-reactive component. The blowing agent may be present in any amount ranging between any combination of the above values, inclusive, such as from at least about 0.5% to about 20% or less, or from at least about 0.75% to about 10% by weight or less, based on 100% by weight of isocyanate-reactive component.

When water is the blowing agent, the amount of water typically present can range from at least about 0.5 to about 10%, based on 100% by weight of the isocyanate-reactive component. In some instances, the amount of blowing agent present may be at least 0.5% or at least 0.75% by weight, based on 100% by weight of the isocyanate-reactive component. The amount of water present as a blowing agent may also be about 10% or less, or about 7% by weight or less, based on 100% by weight of the isocyanate-reactive component. The blowing agent may be present in any amount ranging between any combination of the above values, inclusive, such as from at least about 0.5% to about 10% or less, or from at least about 0.75% to about 7% by weight or less, based on 100% by weight of isocyanate-reactive component. The addition of water can be effected in combination with the use of the other blowing agents described. In accordance with the present invention, water is the preferred blowing agent. Also, preferred is the use of water along with pressurized carbon dioxide that is dispersed in the polyol or resin blend and frothed by passing through a pressure let down device such as employed for example in the Hennecke Novaflex, CarDio (Cannon Viking Limited) and Beamech (CO-2) machines, which are known by those skilled in the art.

The foam is produced in the presence of (5) a surfactant, which helps to stabilize the foam until it cures. Suitable surfactants are those well known in the polyurethane industry. A wide variety of organosilicone surfactants are commercially available. Examples of suitable surfactants are Niax L-620 surfactant, a product of Momentive Performance Materials, and Tegostab B8244, a product of Evonik-Goldschmidt. Many other silicone surfactants known to those in the art may be substituted for these suitable silicones. The surfactant is typically used in an amount within the range of from at least about 0.1 to about 4 parts, per 100 parts of isocyanate-reactive mixture. Surfactants may be present in amounts ranging from at least about 0.1, or from at least about 0.2 parts per 100 parts of isocyanate-reactive mixture.

The surfactants may be also present in amounts ranging from about 4 parts or less, or from about 3 parts or less, per 100 parts of isocyanate-reactive mixture. The amount of surfactants may range between any combination of these upper and lower values, inclusive, such as from at least about 0.1 to about 4 parts, or from at least about 0.2 to about 3 parts, per 100 parts of isocyanate-reactive mixture.

At least one polyurethane catalyst (4) is required to catalyze the reactions of the isocyanate-reactive components and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate is particularly preferred. Preferred organoamine catalysts are tertiary amines such as trimethylamine, triethylamine, triethylenediamine, bis(2,2'-dimethyl-amino)ethyl ether, N-ethylmorpholine, diethylenetriamine, and the like.

In another embodiment, suitable amine catalysts include non-emissive balanced amines which bind chemically into the polyurethane foam matrix and eliminate contributions to odor and VOC emissions or is of high enough molecular weight so as to not to contribute to VOC emissions. These are also referred to as non-fugitive amine catalysts. Examples of these catalysts include Dabco NE-300 and Dabco NE-500 from Air Products, N,N-bis(3-dimethyl-aminopropyl)-N-isopropanolamine (commercially available as Jeffcat ZR 50), N-(3-dimethylaminopropyl)-N,N-diisopropanolamine (commercially available as Jeffcat DPA), 1,4-diazabicyclo[2.2.2]octane-2-methanol (commercially available as RZETA) from TOSOH Corporation.

The polyurethane catalysts are typically used in an amount within the range of about 0.01 to about 3 parts per 100 parts of isocyanate-reactive mixture. The polyurethane catalysts may be present in amounts of from at least about 0.01, or from at least about 0.1 parts per 100 parts of isocyanate-reactive mixture. The polyurethane catalysts may be present in amounts of about 3 parts or less, or of about 2 parts per 100 parts of isocyanate-reactive mixture. The polyurethane catalysts may be present in any amount ranging between any combination of these upper and lower values, inclusive, such as from at least about 0.01 to about 3 parts, or from at least about 0.1 to about 2 parts, per 100 parts of isocyanate-reactive mixture.

Flame retardants, antioxidants, pigments, dyes, liquid and solid fillers, and many other commercial additives can also be included in the foams in conventional amounts.

The foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor.

Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The foam expands to fill the mold and produce a part with the shape and dimensions of the mold.

Although less preferred, a prepolymer approach to making the foams can also be used. In this approach, a significant portion of the isocyanate-reactive mixture is reacted with the polyisocyanate, and the resulting prepolymer is then reacted with the remaining components.

As used and referred to throughout the specification, air flow was measured in accordance with the NOPCO test procedure described by R. E. Jones and G. Fesman, "Journal of Cellular Plastics," January, 1965, Vol. No. 1, pp. 200-216, the disclosure of which is herein incorporated by reference, using a Amscor Model 1377 automated foam porosity tester. A 2 inch×2 inch×1 inch piece of foam was cut from near the center of the test specimens. Air flow, expressed as standard cubic feet per minute (i.e. scfpm), was measured through the 1 inch thickness at a pressure differential of 0.5 inches of water less than atmospheric pressure. The air flow was in the direction of rise of the foam.

The test used to define foam recovery rate from deformation is the 95% height recovery time as described in ASTM D 3574-11 Test M. A recovery rate of less than 3 seconds, indicates a fast recovering foam such as observed for resilient foam types. A recovery rate of greater than or equal to 3 seconds is indicative of a slow recovery foam often referred to as "viscoelastic" or "memory" foam.

Other foam physical properties reported herein were measured per the standard procedures described in ASTM D3574-11.

Commercial production of flexible polyurethane foams involves mixing together a suitable polyisocyanate, a blowing agent, and an isocyanate-reactive component or mixture in the presence of a surfactant, one or more catalysts, and various other compounds which are known in the field of polyurethane chemistry to be suitable for preparing flexible foams. Other isocyanate-reactive compounds to be used in addition to the above described polyol blends which comprise (a) the in-situ formed polyol blend and (b) the filled polyol, include other conventional polyols which are well known in the field of polyurethane chemistry. These conventional polyols include the relatively high molecular weight compounds such as, for example, polyether polyols, polyester polyols, polymer polyols, amine-terminated polyethers, polythioethers, polyacetals and polycarbonates, as well as various low molecular weight chain extenders and/or crosslinking agents both of which may contain hydroxyl groups and/or amine groups capable of reacting with the isocyanate groups of the isocyanate component.

In addition, the isocyanate-reactive component to be used in the flexible polyurethane foams herein may additionally comprise (c) a polyether polyol having an OH number of from about 10 to about 300, a functionality of from about 2 to about 8, and which contain from 0 to 45% by weight of copolymerized oxyethylene, based on 100% by weight of component (c).

In a first embodiment, the invention is directed to a flexible polyurethane foam which comprises the reaction product of (1) toluene diisocyanate, with (2) an isocyanate-reactive component in the presence of (3) a blowing agent, (4) a catalyst, and (5) a surfactant, wherein the isocyanate-reactive component comprises: (a) from 70 to 95% by weight, based on 100% by weight of components (a) and (b), of an in-situ formed polyol blend having a hydroxyl number of from about 56 mg KOH/g polyol to about 250 mg KOH/g polyol, a functionality of greater than 2, and comprising: (i) from 25 to 75% by weight, based on 100% by weight of (i) and (ii), of a polyether monol having a hydroxyl number of less than 56 mf KOH/g polyol, and containing less than 20% by weight of copolymerized oxyethylene, based on 100% by weight of (a)(i), and (ii) from 25 to 75% by weight, based on 100% by weight of (i) and (ii), of a polyether polyol having a hydroxyl number of about 47 mg KOH/g polyol to about 300 mg KOH/g polyol, an average functionality of greater than 2 to about 6, and containing from about 5 to about 45% by weight of copolymerized oxyethylene, based on 100% by weight of (a)(ii); and (b) from 5 to 30% by weight, based on 100% by weight of components (a) and (b), of a filled polyol, wherein the resultant foam has a 90% compression set of less than or equal to 10% (or less than or equal to 5%) as measured by ASTM D3574-11 at an isocyanate index of at least 100.

In a second embodiment, the invention is directed to the flexible polyurethane foam according to the first embodiment wherein the isocyanate-reactive component additionally comprises: (c) a polyether polyol having a functionality of from about 2 to about 8, a hydroxyl number of from about 10 mg KOH/g polyol to about 300 mg KOH/g polyol, and comprising from 0 to about 45% by weight of copolymerized oxyethylene, based on 100% by weight of component (c).

In a third embodiment, the invention is directed to the flexible polyurethane foam according to the first or second embodiments wherein (a)(ii) comprises at least one polyether diol and at least one polyether triol.

In a fourth embodiment, the invention is directed to the flexible polyurethane foam according to at least one of the first to third embodiments wherein (a)(i) said polyether monol has a hydroxyl number of less than 28 mg KOH/g polyol; (a)(ii) said polyether polyol has a hydroxyl number of about 70 mg KOH/g polyol to about 240 mg KOH/g polyol, and a functionality of about 2.5 to about 3.5; and (b) said filled polyol comprise at least one of (i) polymer polyols containing styrene-acrylonitrile solids, (ii) polyisocyanate polyaddition polyols, and (iii) polyhydrozaodicarbonamide polyols.

In a fifth embodiment, the invention is directed to the flexible polyurethane foam according to at least one of the first through fourth embodiments wherein (c) said polyether polyol has a hydroxyl number of at least about 20 mg KOH/g polyol to about 150 mg KOH/g polyol and a functionality of from at least about 2.5 to about 6.

In a sixth embodiment, the invention is directed to the foam according to at least one of the first through fifth embodiments wherein the catalyst comprises a non-fugitive amine catalyst.

In a seventh embodiment, the invention is directed to the flexible polyurethane foam according to at least one of the first through sixth embodiments wherein the blowing agent comprises water.

In an eighth embodiment, the invention is directed to the flexible polyurethane foam according to at least one of the first through seventh embodiments wherein the reaction product additionally comprises a foam modifier and/or a foam processing aid, wherein said foam modifier and/or said foam processing aid each have a hydroxyl number of at least 300 mg KOH/g polyol.

In a ninth embodiment, the invention is directed to the flexible polyurethane foam according to at least one of the first through eighth embodiments wherein the resultant flexible polyurethane foam has a 90% compression set of less than or equal to 5% as measured by ASTM D-3574-11 at an isocyanate index of at least 100.

In a tenth embodiment, the invention is directed to an article comprising the flexible polyurethane foam according to at least one of the first through the ninth embodiments wherein the article comprises a body support.

In an eleventh embodiment, the invention is directed to the article of the tenth embodiment wherein the body support comprises a pillow or a mattress topper.

In a twelfth embodiment, the invention is directed to a process for the production of a flexible polyurethane foam comprising reacting toluene diisocyanate, with an isocyanate-reactive component in the presence of a blowing agent, a catalyst, and a surfactant, wherein the isocyanate-reactive component comprises (a) from 70 to 95% by weight, based on 100% by weight of components (a) and (b), of an in-situ formed polyol blend having a hydroxyl number of from about 56 mg KOH/g polyol to about 250 mg KOH/g polyol, and an average functionality greater than 2, and which comprises: (i) from 25 to 75% by weight, based on 100% by weight of (i) and (ii), of a polyether monol having an average hydroxyl number of less than 56 mg KOH/g polyol, and containing less than 20% by weight of copolymerized oxyethylene, based on 100% by weight of (a)(i), and (ii) from 25 to 75% by weight, based on 100% by weight of (i) and (ii), of a polyether polyol having a hydroxyl number of about 47 mg KOH/g polyol to about 300 mg KOH/g polyol, an average functionality of greater than 2 to about 6, and containing from about 5 to about 45% by weight of copolymerized oxyethylene, based on 100% by weight of (a)(ii); and (b) from 5 to 30% by weight, based on 100% by weight of components (a) and (b), of a filled polyol; wherein the resultant foam has a 90% compression set of less than or equal to 10% (or less than or equal to 5%) as measured by ASTM D3574-11 at an isocyanate index of at least 100.

In a thirteenth embodiment, the invention is directed to the process according to the twelfth embodiment wherein the isocyanate-reactive component additionally comprises: (c) a polyether polyol having a functionality of from about 2 to about 8, a hydroxyl number of from about 10 mg KOH/g polyol to about 300 mg KOH/g polyol, and comprising from 0 to about 45% by weight of copolymerized oxyethylene, based on 100% by weight of component (c).

In a fourteenth embodiment, the invention is directed to the process according to at least one of the twelfth and thirteenth embodiments wherein (a)(ii) comprises at least one polyether diol and at least one polyether triol.

In a fifteenth embodiment, the invention is directed to the process according to at least one of the twelfth through the fourteenth embodiments wherein (a)(i) said polyether monol has a hydroxyl number of less than 28 mg KOH/g polyol; (a)(ii) said polyether polyol has a hydroxyl number of about 70 mg KOH/g polyol to about 240 mg KOH/g polyol, and a functionality of about 2.5 to about 3.5; and (b) said filled polyol comprises at least one of (i) polymer polyols containing styrene-acrylonitrile solids, (ii) polyisocyanate polyaddition polyols, and (iii) polyhydrozaodicarbonamide polyols.

In a sixteenth embodiment, the invention is directed to the process according to at least one of the twelfth through the fifteenth embodiments wherein (c) said polyether polyol has a hydroxyl number of at least about 20 mg KOH/g polyol to about 150 mg KOH/g polyol and a functionality of from at least about 2.5 to about 6.

In a seventeenth embodiment, the invention is directed to the process according to at least one of the twelfth through the sixteenth embodiments wherein the catalyst comprises a non-fugitive amine catalyst.

In an eighteenth embodiment, the invention is directed to the process according to at least one of the twelfth through the seventeenth embodiments wherein the blowing agent comprises water.

In a nineteenth embodiment, the invention is directed to the process according to at least one of the twelfth through the eighteenth embodiments wherein the reaction additionally comprises a foam modifier and/or a foam processing aid, wherein said foam modifier and/or said foam processing aid each have a hydroxyl number of at least 300 mg KOH/g polyol.

In a twentieth embodiment, the invention is directed to the process according to at least one of the twelfth through the nineteenth embodiments, wherein the resultant flexible polyurethane foam has a 90% compression set of less than or equal to 5% as measured by ASTM D-3574-11 at an isocyanate index of at least 100.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Test Methods:

Hydroxyl Numbers: were determined in accordance with ASTM D-4274-11, and are reported in mg KOH/g polyol.

Gel Permeation Chromotography: all number average and weight average, $M_n$ and $M_w$ respectively, molecular weights were determined by gel-permeation chromatography (GPC) using a method based on DIN 55672-1 employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol.

Viscosity: Viscosity was conducted on an Anton-Paar SVM 3000 viscometer at 25° C. that has been demonstrated to give equivalent results as can be generated with ASTM-D4878-15. The instrument was calibrated using mineral oil reference standards of known viscosity. The viscosities are given in mPa·s at 25° C.

PMPO Solids Content: The total solids levels (i.e., weight percent of polyacrylonitrile and polystyrene) of the polymer polyols were measured by an analytical technique known as near-infrared (NIR) spectroscopy. The specific NIR measurement of total solids is a variation on ASTM D6342-12, "Polyurethane Raw Materials: Determining Hydroxyl Number of Polyols by Near Infrared (NIR) Spectroscopy". The variations used include (1) substitution of the absorption bands associated with polyacrylonitrile and polystyrene instead of those associated with hydroxyl number, and (2) acquiring the NIR spectra in reflection mode rather than transmission mode. The use of reflection mode is due to polymer polyols being opaque, and thus are scattering materials with respect to infrared radiation. Measurement of the NIR spectra in reflection mode results in higher quality spectra for calibration and measurement purposes as PMPOs reflect more NIR radiation than they transmit. Calibrations to be used as standards were developed in accordance with ASTM D6342-12. In addition, the absorption bands associated with polyacrylonitrile and polystyrene are used to calculate the weight ratio of styrene:acrylonitrile in the total polymer. One skilled in the art will recognize that this is an analytical confirmation of the main mechanism for controlling the S/AN ratio, which is the wt % of monomers in the total reactor feed.

Other foam physical properties reported herein were measured per the standard procedures described in ASTM D3574-11.

As used herein, "pphp" represents parts per hundred parts. The following materials were used in the working examples:

Isocyanate A: toluene diisocyanate having 80% of 2,4-isomer and 20% of 2.6-isomer Polyol A: An in-situ prepared multifunctional polyol prepared by alkoxylating a monol, diol, and triol with a DMC catalyst following the procedure described in U.S. Pat. No. 6,491,846. The starter comprises a 1600 MW (35 OH#) monol made from the propoxylation of Neodol 25 and is alkoxylated with a mixture of propylene oxide and ethylene oxide in a weight ratio of 82/18 to a hydroxyl number of about 17.8. At this point, a mixture of glycerin and propylene glycol in a 62.3 to 37.7 wt % ratio is continuously added along with mixture of propylene oxide and ethylene oxide in a weight ratio of 82/18 until a hydroxyl number of about 150 is reached. At this point, the propylene glycol and glycerin feeds are stopped and propylene oxide and ethylene oxide are continuously added in a weight ratio of 55/45 until a hydroxyl number of 120 was reached. The product had an overall functionality of about 2.4 and an overall hydroxyl number of about 120.

Polyol B: A polymer polyol containing about 44% solids, and prepared by in-situ polymerization of styrene and acrylonitrile in a glycerin started poly(oxypropyleneoxyethylene) polyol having a hydroxyl number of about 28, and containing about 13% of oxyethylene Surfactant A: A silicone surfactant commercially available from Momentive Performance Materials as Niax L-618

Foam Modifier A: A foam modifier having a hydroxyl number of about 1240, commercially available from Momentive Performance Materials as Arcol DP-1022

Catalyst A: An amine catalyst, commercially available from Momentive Performance Materials as NIAX A-1

Catalyst B: An amine catalyst, commercially available from Momentive Performance Materials as NIAX A-33

Catalyst C: A tin, commercially available from Air Products, now Versum, as Dabco T-9

TABLE 1A

TDI Foam Formulations

| Example | | 1 | 2 | 3 | 4 | 5 |
|---|---|---|---|---|---|---|
| Chemical | OH # | pphp | pphp | pphp | pphp | pphp |
| Polyol A | 120 | 80.00 | 90.00 | 90.00 | 70.00 | 70.00 |
| Polyol B | 52 | 20.00 | 10.00 | 10.00 | 30.00 | 30.00 |
| Foam Modifier A | 1244 | 1.00 | 0 | 0 | 0 | 0 |
| Water (distilled) | 6228 | 1.30 | 1.30 | 1.30 | 1.30 | 1.30 |
| Surfactant A | | 0.50 | 0.50 | 0.50 | 0.50 | 0.50 |
| Catalyst A | 560 | 0.03 | 0.03 | 0.03 | 0.03 | 0.03 |
| Catalyst B | 251 | 0.60 | 0.60 | 0.60 | 0.60 | 0.60 |
| Catalyst C | | 0.03 | 0.03 | 0.03 | 0.03 | 0.03 |
| Isocyanate Side | F NCO* | | | | | |
| Isocyanate A | 48.3 | 29.23 | 25.72 | 31.77 | 23.30 | 28.78 |
| NCO Index | | 95.00 | 85.00 | 105.00 | 85.00 | 105.00 |

*F NCO represents the NCO group content of the isocyanate component
Examples 1, 2 and 4 are comparative

TABLE 1B

TDI Foam Formulations

| Example | | 6 | 7 | 8 | 9 | 10 | 11 |
|---|---|---|---|---|---|---|---|
| Chemical | OH # | pphp | pphp | pphp | pphp | pphp | pphp |
| Polyol A | 120 | 80.00 | 90.00 | 90.00 | 70.00 | 70.00 | 80.00 |
| Polyol B | 56 | 20.00 | 10.00 | 10.00 | 30.00 | 30.00 | 20.00 |
| Foam Modifier A | 1244 | 1.00 | 2.00 | 2.00 | 2.00 | 2.00 | 1.00 |
| Water (distilled) | 6228 | 1.30 | 1.30 | 1.30 | 1.30 | 1.30 | 1.30 |
| Surfactant A | | 0.50 | 0.50 | 0.50 | 0.50 | 0.50 | 0.50 |
| Catalyst A | 560 | 0.03 | 0.03 | 0.03 | 0.03 | 0.03 | 0.03 |
| Catalyst B | 251 | 0.60 | 0.60 | 0.60 | 0.60 | 0.60 | 0.60 |
| Catalyst C | | 0.03 | 0.03 | 0.03 | 0.03 | 0.03 | 0.03 |
| Isocyanate Side | F NCO* | | | | | | |
| Isocyanate A | 48.3 | 29.23 | 29.00 | 35.82 | 26.58 | 32.83 | 29.23 |
| NCO Index | | 95.00 | 85.00 | 105.00 | 85.00 | 105.00 | 95.00 |

*F NCO represents the NCO group content of the isocyanate component
Examples 6, 7, 9 and 11 are comparative The free-rise bench scale foams of Tables 2A and 2B were prepared using the following procedure. The polyols, water, silicone surfactants, amine catalysts, tin catalyst and any other non-isocyanate additives were added to a cylindrical container fitted with baffles. The contents were mixed at 2400 rpm for 60 seconds with an agitator having two turbine impellers. Tin Catalyst C, if employed, was added at this time. The mixture was then degassed for 15 seconds. After degassing, the contents were mixed at 2400 rpm for 15 seconds, during which period the isocyanate was added when about 10 seconds of mixing time remained. The mixture was then poured into a 14×14×6-inch cardboard box, where it rose freely until the reaction was complete. A batch size sufficient to give a bun at least about 6 inches high was employed. The freshly prepared bun was cured for 20 minutes in an oven at 120° C. and then allowed to cure at ambient conditions for a minimum of 1 day. Observations made during foaming and curing are set forth in the Tables. The buns were then trimmed to 12×12×4 inches and were roller crushed 3 times to a minimum thickness of about 0.5 inches. These samples were then conditioned for at least 16 hours at standard temperature (~23° C.) and humidity (~50%) before being tested.

TABLE 2A

TDI Foams - Physical Properties

| Example | | 1 | 2 | 3 | 4 | 5 |
|---|---|---|---|---|---|---|
| Density | kg/m³ | 60.23 | 65.03 | 60.71 | 64.39 | 58.15 |
| | (lb/ft³) | (3.76) | (4.06) | (3.79) | (4.02) | (3.63) |
| Airflow | m³/min | 0.085 | 0.124 | 0.063 | 0.083 | 0.025 |
| | (ft³/min) | (3.01) | (4.39) | (2.24) | (2.92) | (0.89) |
| IFD 25% | N(lbf) | 42.35 | 23.71 | 62.90 | 44.53 | 97.37 |
| | | (9.52) | (5.33) | (14.14) | (10.01) | (21.89) |
| IFD 65% | N(lbf) | 101.11 | 60.59 | 136.96 | 104.84 | 213.60 |
| | | (22.73) | (13.62) | (30.79) | (23.57) | (48.02) |
| IFD 25% Return | N(lbf) | 36.43 | 19.93 | 55.16 | 36.52 | 81.89 |
| | | (8.19) | (4.48) | (12.40) | (8.21) | (18.41) |
| Return Val. 25% | % | 86.05 | 83.93 | 87.72 | 82.07 | 84.12 |
| S.F. 65%/25% | | NA | 2.39 | 2.55 | 2.18 | 2.36 | 2.20 |
| Tensile Strength | Kpa (psi) | 66.12 | 32.20 | 69.91 | 42.89 | 96.87 |
| | | (9.59) | (4.67) | (10.14) | (6.22) | (14.05) |
| Elongation | % | 215.17 | 218.87 | 187.93 | 184.60 | 172.00 |
| Tear Strength (2"/MIN1) | N/m (ph) | 0.11 | 0.06 | 0.11 | 0.06 | 0.11 |
| | | (0.93) | (0.54) | (0.95) | (0.58) | (1.00) |
| 90% Comp Set | % | 52.55 | 78.03 | 3.63 | 87.08 | 3.26 |
| Ball Rebound | % | 7.00 | 2.33 | 5.87 | 9.60 | 12.00 |

TABLE 2A-continued

TDI Foams - Physical Properties

| Example | | 1 | 2 | 3 | 4 | 5 |
|---|---|---|---|---|---|---|
| Visco Recovery | Secs | 4.67 | 4.67 | 4.00 | 4.00 | 4.67 |
| 90% Wet Set | % | 18.42 | 62.83 | 2.82 | 85.63 | 2.29 |

TABLE 2B

TDI Foams - Physical Properties

| Example | | 6 | 7 | 8 | 9 | 10 | 11 |
|---|---|---|---|---|---|---|---|
| Density | kg/m$^3$ | 59.91 | 65.20 | 60.55 | 64.71 | 59.43 | 60.07 |
| | (lb/ft$^3$) | (3.74) | (4.07) | (3.78) | (4.04) | (3.71) | (3.75) |
| Airflow | m$^3$/min | 0.089 | 0.188 | 0.099 | 0.118 | 0.012 | 0.086 |
| | (ft $^3$/min) | (3.18) | (6.63) | (3.52) | (4.17) | (0.44) | (3.03) |
| IFD 25% | N(lbf) | 40.52 | 10.54 | 54.27 | 16.37 | 84.83 | 41.32 |
| | | (9.11) | (2.37) | (12.20) | (3.68) | (19.07) | (9.29) |
| IFD 65% | N(lbf) | 94.44 | 28.25 | 118.72 | 43.59 | 180.42 | 96.44 |
| | | (21.23) | (6.35) | (26.69) | (9.80) | (40.56) | (21.68) |
| IFD 25% Return | N(lbf) | 34.78 | 8.90 | 45.33 | 12.72 | 66.59 | 35.41 |
| | | (7.82) | (2.00) | (10.19) | (2.86) | (14.97) | (7.96) |
| Return Val. 25% | % | 85.84 | 84.12 | 83.60 | 77.86 | 78.52 | 85.68 |
| S.F. 65%/25% | NA | 2.33 | 2.68 | 2.19 | 2.67 | 2.13 | 2.33 |
| Tensile Strength | Kpa (psi) | 63.71 | 29.72 | 114.32 | 24.89 | 118.24 | 60.95 |
| | | (9.24) | (4.31) | (16.58) | (3.61) | (17.15) | (8.84) |
| Elongation | % | 225.73 | 336.83 | 242.03 | 184.13 | 188.73 | 216.67 |
| Tear Strength (2"/MIN1) | N/m (ph) | 0.10 | 0.08 | 0.15 | 0.04 | 0.17 | 0.09 |
| | | (0.88) | (0.69) | (1.35) | (0.37) | (1.48) | (0.84) |
| 90% Comp Set | % | 43.81 | 6.91 | 1.90 | 89.08 | 3.82 | 22.94 |
| Ball Rebound | % | 5.80 | 0.00 | 6.33 | 4.53 | 10.00 | 5.87 |
| Visco Recovery | Secs | 4.33 | 11.00 | 5.33 | 13.00 | 13.67 | 4.67 |
| 90% Wet Set | % | 3.19 | 5.48 | 1.13 | 87.16 | 1.80 | 3.22 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of preparing a flexible polyurethane foam comprising:
    (A) reacting:
        (1) toluene diisocyanate;
        with
        (2) an isocyanate-reactive component comprising:
            (a) from 70 to 95% by weight, based on 100% by weight of component (a) and component (b), of an in-situ formed polyol blend having a hydroxyl number of from about 56 mg KOH/g polyol to about 250 mg KOH/g polyol, an average functionality greater than 2 and comprising:
                (i) from 25 to 75% by weight, based on 100% by weight of (i) and (ii), of a polyether monol having a hydroxyl number of less than 56 mg KOH/g polyol, and containing less than 20% by weight of copolymerized oxyethylene, based on 100% by weight of (a)(i),
                and
                (ii) from 25 to 75% by weight, based on 100% by weight of (i) and (ii), of a polyether polyol having a hydroxyl number of about 47 mg KOH/g polyol to about 300 mg KOH/g polyol, an average functionality of greater than 2 to about 6, and containing from about 5 to about 45% by weight of copolymerized oxyethylene, based on 100% by weight of (a)(ii);
            and
            (b) from 5 to 30% by weight, based on 100% by weight of component (a) and component (b), of a filled polyol;
            with the proviso that the isocyanate-reactive component is free of polyether polyols which have a functionality of at least about 2 to about 8 or less, a hydroxyl number of at last about 20 to about 240 or less, and which contain at least 50% of copolymerized oxyethylene, based on 100% by weight of said polyether polyols;
        in the presence of
        (3) a blowing agent;
        (4) a catalyst;
        and
        (5) a surfactant;
    wherein the resultant foam has a 90% compression set of less than or equal to 10% as measured by ASTM D3574-11 at an isocyanate index of at least 100.

2. The process according to claim 1, wherein (2) said isocyanate-reactive component additionally comprises:
    (c) a polyether polyol having a functionality of from about 2 to about 8, a hydroxyl number of from about 10 mg KOH/g polyol to about 300 mg KOH/g polyol, and comprising from 0 to about 45% by weight of copolymerized oxyethylene, based on 100% by weight of component (c).

3. The process according to claim 1, wherein (a)(ii) comprises at least one polyether diol and at least one polyether triol.

4. The process according to claim 1, wherein (a)(i) said polyether monol has a hydroxyl number of less than 28 mg KOH/g polyol; (a)(ii) said polyether polyol has a hydroxyl number of about 70 mg KOH/g polyol to about 240 mg KOH/g polyol, and a functionality of about 2.5 to about 3.5; and (b) said filled polyol comprises at least one of: (i)

polymer polyols containing styrene-acrylonitrile solids, (ii) polyisocyanate polyaddition polyols, and (iii) polyhydrazodicarbonamide polyols.

5. The process according to claim 1, wherein (c) said polyether polyol has a hydroxyl number of at least about 20 mg KOH/g polyol to about 150 mg KOH/g polyol and a functionality of at least about 2.5 to about 6.

6. The process according to claim 1, which additionally comprises reacting a foam modifier and/or a foam processing aid, wherein said foam modifier and/or said foam processing aid each have a hydroxyl number of at least 300 mg KOH/g polyol.

7. The process according to claim 1, wherein the resultant foam has a 90% compression set of less than or equal to 5% as measured by ASTM D-3574-11 at an isocyanate index of at least 100.

8. The process according to claim 1, wherein the catalyst comprises a non-fugitive amine catalyst.

9. The process according to claim 1, wherein the blowing agent comprises water.

10. The process according to claim 1, wherein the reaction between said isocyanate-functional component and said isocyanate-reactive component occurs in the presence of one or more crosslinkers and/or foam stabilizers.

* * * * *

UNITED STATES PATENT AND TRADEMARK OFFICE
CERTIFICATE OF CORRECTION

| | | |
|---|---|---|
| PATENT NO. | : 10,766,998 B2 | Page 1 of 1 |
| APPLICATION NO. | : 15/819261 | |
| DATED | : September 8, 2020 | |
| INVENTOR(S) | : Nigel Barksby et al. | |

It is certified that error appears in the above-identified patent and that said Letters Patent is hereby corrected as shown below:

In the Specification

In Table 1A at Column 20: in Column 2 which is labeled "OH #", Line 8, of Table 1A, please delete "52" and insert --28-- therefore.

In Table 1B at Column 20: in Column 2 which is labeled "OH #", Line 28, of Table 1B, please delete "56" and insert --28-- therefore.

Signed and Sealed this
Ninth Day of March, 2021

Drew Hirshfeld
*Performing the Functions and Duties of the
Under Secretary of Commerce for Intellectual Property and
Director of the United States Patent and Trademark Office*